United States Patent

Little

Patent Number: 5,999,520
Date of Patent: Dec. 7, 1999

[54] TERRESTRIAL FLIGHT TELEPHONE SYSTEM

[75] Inventor: John Little, South Woodham Ferrers, United Kingdom

[73] Assignee: Gec-Marconi Limited, United Kingdom

[21] Appl. No.: 08/728,804

[22] Filed: Oct. 10, 1996

[30] Foreign Application Priority Data

Oct. 31, 1995 [GB] United Kingdom .................. 9522294

[51] Int. Cl.[6] .............................................. H04B 7/24
[52] U.S. Cl. ..................... 370/324; 455/431; 379/343
[58] Field of Search .................................. 370/324, 329, 370/343; 455/39, 73, 431, 524, 550; 379/343; 368/28, 13, 14; 342/357, 356

[56] References Cited

U.S. PATENT DOCUMENTS

| 3,643,259 | 2/1972 | Entner | 342/357 |
|---|---|---|---|
| 4,014,166 | 3/1977 | Cateora | 368/28 |
| 4,414,661 | 11/1983 | Karlstrom | 370/332 |
| 4,602,375 | 7/1986 | Inukai | 370/324 |
| 5,212,804 | 5/1993 | Choate | 455/431 |
| 5,378,155 | 1/1995 | Eldridge | 455/39 |
| 5,438,610 | 8/1995 | Bhagat et al. | 370/343 |

FOREIGN PATENT DOCUMENTS 2 227 393   7/1990   United Kingdom ............. H04Q 7/04

*Primary Examiner*—Dang Ton
*Assistant Examiner*—Shick Hom
*Attorney, Agent, or Firm*—Venable; Robert J. Frank; Robert Kinberg

[57] ABSTRACT

A terrestrial flight telephone system comprises a number of air stations which communicate on a common frequency with a ground station. The ground station can handle calls from a number of air stations in respective slots of sequential frames defined by the ground station. Accurate synchronisation is critical to the functioning of the system and drift in an oscillator of the air station, which controls the timing of transmissions from the air station, is corrected by signals received from the ground station.

11 Claims, 2 Drawing Sheets

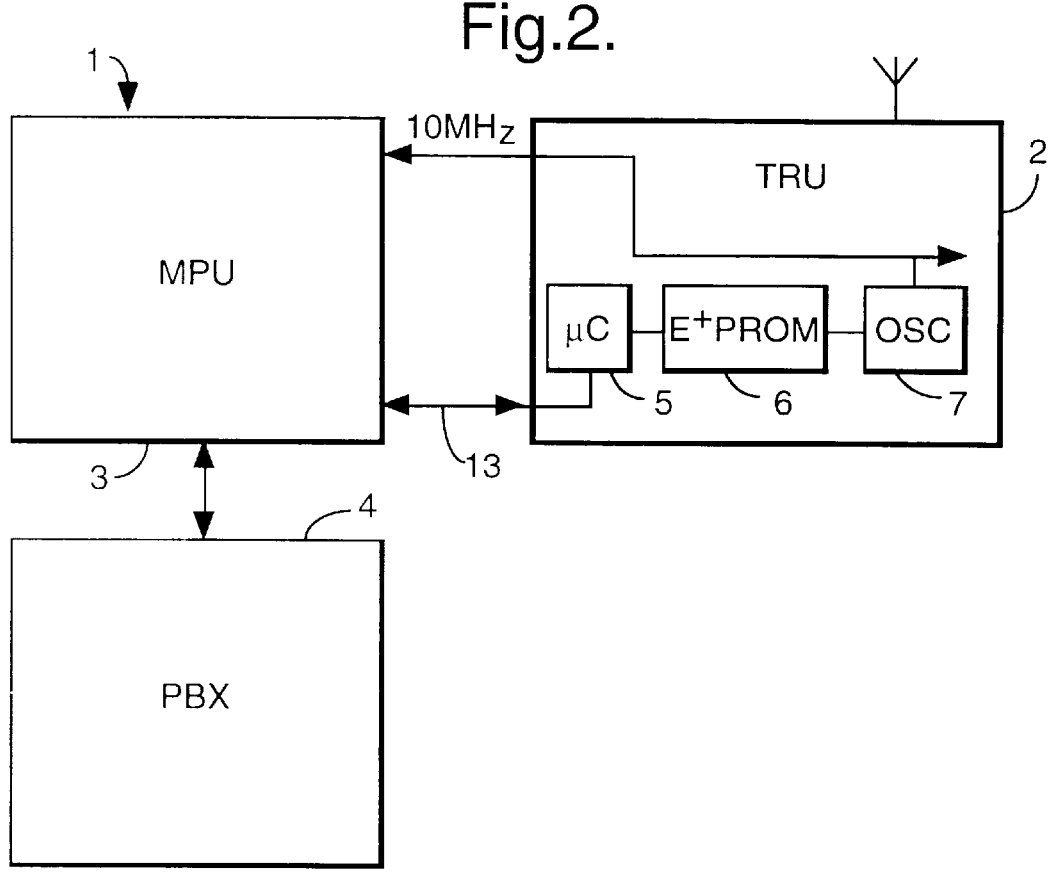
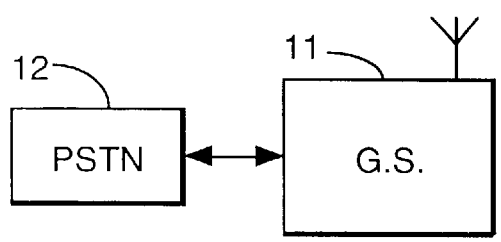

TERRESTRIAL FLIGHT TELEPHONE SYSTEM

BACKGROUND OF THE INVENTION

The present invention relates to a terrestrial flight telecommunications system and a method of operating same, and more particularly it relates to synchronising an air station with a ground station.

Terrestrial flight telephone systems are being developed for commercial airliners to enable passengers on those airliners to communicate with the public switched telephone network (PSTN). These systems, some of which are already in service on a trial basis, operate in a manner similar to a cellular mobile telephone system, in that each aircraft comprises what is termed an "air station" which communicates with a selected one of a plurality of ground stations, one way in which the selection process could be made being described in co-pending U.S. patent application Ser. No. 08/688,159, filed Jul. 29,1996, entitled "A Telecomununications System". An example of such a terrestrial flight telecommunications system is found in the European Telecommunications Standard Institute (ETSI) entided "Radio Equipment and Systems (RES) Terrestrial Flight Telephone System (TFTS) Part 2: Search Services, Radio Interface" published as prETS300 326-2, the contents of which are hereby incorporated by way of reference.

A complete description of a terrestrial flight telephone system is beyond the scope of this specification and the reader is referred to the above cited ETSI document for a detailed description of such a system. This invention is concerned with one particular aspect of such a system, namely, maintaining synchronisation between an air station aboard at aircraft and a ground station. The reason why this synchronisation is necessary arises as a result of it being necessary to have a time division multiple access (TDMA) system which permits a number of air stations to simultaneously use a particular ground station on a common frequency. This is achieved by the ground station defining sequential frames, each frame contining a number of time slots, one or more of those time slots being assigned to each respective air station. This in turn requires very accurate control of the transmission of signals from the air stations to ensure that they arrive in the appropriate time slot, for any drift in one transmission time will interfere with signals associated with an adjacent slot.

The above referred to ETSI document discloses in detail one way in which a number of air stations can be synchronize to a common ground station, and as an understanding of this is necessary in order to appreciate the present invention, a summary of this will now be provided with reference to FIG. 1.

Referring to FIG. 1 there is illustrated a schematic timing diagram which enables synchronisation to be achieved between a ground station and a number of air stations in a time division multiple access (TDMA) terrestrial flight telephone system (TFTS). The ground station (GS) has a clock signal common to a number of ground stations and the clock signal defines network time to which everything is ideally synchronize. In each frame defined by the ground station the ground station transmits a synchronisation signal. This is received by the receivers of air stations (AS) on an aircraft within the cell as illustrated in FIG. 1. The time of receipt will depend on the Lime propagation ground to air (TPGA) determined by the distance between the ground station and the respective air station.

Consider now air station 1 having a receiver RX. Immediately on receiving the digital sync word from the ground station air station 1 itself transmits a sync word which is received by the ground station at a time T equal to twice TPGA. The ground station determines the value of TPGA and transmits this information to the air station by a radio control channel (RCCH) which is comprised in one slot in each frame.

Air station 1 receives from the ground station the TPGA and a slot assigned to it in which the ground station will receive subsequent transmissions from that air station. The air station then transmits data ($TX_1$) to be received in that slot, advancing the transmit slot by a time TPGA such that the data arrives in synchronism with the assigned receive slot at the ground station.

The air station comprises an on-board oscillator and having received both the TPGA and a synchronisation signal from the ground station uses the oscillator to generate an image of network time in the air station. Of course, as already discussed the synchronisation signal does not arrive synchronize with the network clock but differs by a time equal to TPGA. TPGA in turn varies with the distance of the aircraft from the ground station. However, having known the TPGA at initialisation (he air station is able to track TPGA by comparing the time of arrival of subsequent synchronisation signals with the image network time generated by the oscillator. The updated TPGA is used to control the time of subsequent transmissions so that they arrive at the ground station in their allocated slots of subsequent frames.

To maximise traffic density the "dead time" between slots needs to be minimised, but this in turn is dictated by the ability of all air stations and ground stations to be in absolute synchronisation. Absolute synchronisation does not exist due to various factors such as noise, and more importantly drift in the air station oscillators and therefore drift in the air station's image of network time. Drift in the ground station is not a problem as the ground station can be synchronised to network time by a global positioning system or some other means. Also ground stations can have more accurate oscillators being located in a less hostile environment, and also costs of the ground station oscillators is of less concern due to the limited number compared to the potential number of air stations.

The system compensates for "short term" oscillator drift in the air stations, (that is drift which occurs during the period the call is to be transmitted between a ground station and an air station or vice versa), by monitoring at the ground station the time at which transmissions from a particular air station are received relative to the allocated slot. Then at a set time period, for example every ten seconds, the signal from the ground station to the air station is substituted with a RCCR correction signal which advises whether or not the air station needs to advance or retard its transmissions to maintain synchronisation with the ground station. This known system works so long as the oscillator frequency is within a predetermined range. If the oscillator frequency moves outside that range the air station will be so far out of synchronisation by the time it receives a correction signal that it may not be able to receive the correction signal, or the correction applied may not be able to keep up with the rate of drift. This will not only cause the transmission between the ground station and that air station to fail but it may also interfere with transmissions by other air stations using that ground station and could cause these to fail also.

The drift rate of the oscillator can be calibrated prior to installation, but the "long term" drift rate may exceed acceptable limits after a period in service, for example ten years. This long term drift can be addressed by servicing the air station at regular intervals, having a service engineer check the oscillator drift rate and trim the oscillator if necessary. Alternatively it may be possible to obtain oscillators which are sufficiently stable for the 10 year life expectancy of an air station. Such oscillators have not yet been identified by the inventor the problem being that more accurate oscillators use larger crystals, and in an aircraft environment the larger crystal will be subjected to more stress than a smaller crystal resulting in further inaccuracies. More accurate oscillators are also more expensive.

SUMMARY OF THE INVENTION

According to a first aspect of the present invention there is provided a terrestrial flight telephone system comprising a plurality of ground stations and a plurality of air stations. Each air station is carried by a respective aircraft, the ground stations and air stations being arranged to transmit data via radio signals, the ground station having a clock signal, each air station comprising an oscillator and means for synchronising transmissions with a ground station clock signal, characterised in that the air station uses signals received from one or more ground stations to maintain the oscillator at a desired frequency The present invention enables the oscillator to compensate for long term drift by using signals received from the ground stations. The invention is particularly advantageous in a system where the oscillator controls the timing of subsequent transmissions and each ground station further comprises means for monitoring the arrival of the subsequent transmissions and transmits a correction signal to the air station if the timing of those further transmissions drifts relative to a desired timing determined by the ground station clock signal, the air station further comprising means for advancing and/or retarding further subsequent transmissions in response to receiving a correction signal, the air station further comprising means for monitoring successive correction signals and adjusting the frequency of the air station oscillator in dependence thereon.

In the above system an air station already receives all the information from the ground station required to compensate for long term drift, and therefore by appropriate software the air station can itself compensate for long term drift of the oscillator without any modification being made to the ground station signal. The inventor in making the invention has realised that although the short term drift may vary up and down from minute to minute and day to day, and more particularly throughout its operating cycle, by monitoring successive correction signals over a period large relative to the operating cycle of the air station, it is possible to track the long term drift of the oscillator and adjust its frequency accordingly.

To perform the present invention ideally requires a non-volatile memory in which the results of the monitoring process are stored and wherein the monitoring process continues after a non-monitored period with previously recorded results, for in this way a day to day or even decade to decade track can be maintained regardless of the system being shut down each time an aircraft on which it is mounted is out of service.

Preferably the, means for monitoring comprises means for keeping a count which is either incremented for each received correction signal advising that the air station transmission needs to be advanced and decremented for each signal advising it needs to be retarded or vice versa, in this way no matter how slow the drift rate the system will compensate for that drift even if the oscillator only need be reset every couple of years. The oscillator can be easily tuned if it is a voltage controlled oscillator and the monitoring means increments or decrements the control voltage applied to the oscillator Advantageously the means for monitoring increases the frequency of the oscillator when the count reaches a value indicating that the number of correction signals received advising transmission needs to be advanced exceeds by a predetermined value the number of correction signals received advising transmission needs to be retarded, and/or wherein the means for monitoring decreases the frequency of the oscillator when the count reaches a value indicating that the number of correction signals received advising transmission needs to be retarded exceeds by a predetermined value the number of correction signals received advising transmission needs to be advanced. This enables the sensitivity of the oscillator tuning to be controlled by setting the predetermined value.

Preferably the frequency of correction signals, the predetermined value or values, and the duration for which the air station is normally expected to be in the cell associated with one particular ground station, are such that the number of correction signals received from one ground station alone are not sufficient to cause the means for monitoring to alter the frequency of the oscillator. This ensures that, should an error occur in a ground station such that incorrect correction signals are sent to an air station, the air station will not be in the cell associated with that ground station for sufficient time for the aircraft oscillator to be incorrectly tuned, thus ensuring that when the air station passes to the next cell it is still in synchronisation with the true network time. Furthermore, the tuning performed by the present invention is not intended to compensate for short term drift for this is already compensated for by the system described above with reference to FIG. 1. Therefore it is desirable that any rapid change in the drift should not alter significantly the frequency of the oscillator for this should not change greatly and any such change may be due to an error elsewhere in the system. However if the frequency of the oscillator were tuned to try and compensate for this then it would no longer be possible for the air station to communicate with the rest of the network and therefore correct itself when the error on the system was rectified, or if the error were associated with a particular ground station, when the air station proceeded into another cell serviced by a correctly functioning ground station.

Preferably the monitoring means comprises an Electrically Erasable Programmnable Read Only Memory ($E^2$PROM) with a stored fixed value at a midpoint of a predetermined scale, and a variable which is incremented or decremented in dependence on the received correction signals. The oscillator frequency is adjusted when the variable reaches either end of the scale at which point the variable is reset to the mid-point.

The clock signals of a plurality of ground stations are preferably synchronised, defining a network time.

According to a second aspect of the present invention there is provided an air station for use with a terrestrial flight telephone system in accordance with the first aspect of the invention.

In accordance with a third aspect of the invention there is provided a method of operating a terrestrial flight telephone system comprising: providing a clock signal at a ground station; transmitting data between an air station aboard an aircraft and the ground station by means of a time division multiplexed radio signal; synchronising transmissions from the air station with the ground station clock signal and maintaining synchronisation by means of an oscillator of the air station; monitoring the signals received at the ground station and transmitting a correction signal to the air station if the timing of the signals received at the ground station from the air station drift relative to a desired timing determined by the ground station clock signal: advancing and/or retarding transmissions from the air station in response to receiving a correction signal; and monitoring successive correction signals and adjusting the frequency of the air station oscillator in dependence thereon.

BRIEF DESCRIPTION OF THE DRAWINGS

One embodiment of the present invention will now be described by way of example only with reference to the accompanying figures, of which:

FIG. 2 schematically illustrates the components of an air station of a system in accordance with the present invention; and FIG. 3 schematically illustrates the components of a ground station of a system in accordance with the present invention.

DETAILED DESCRIPTION OF A PREFERRED EMBODIMENT

Figure 1:
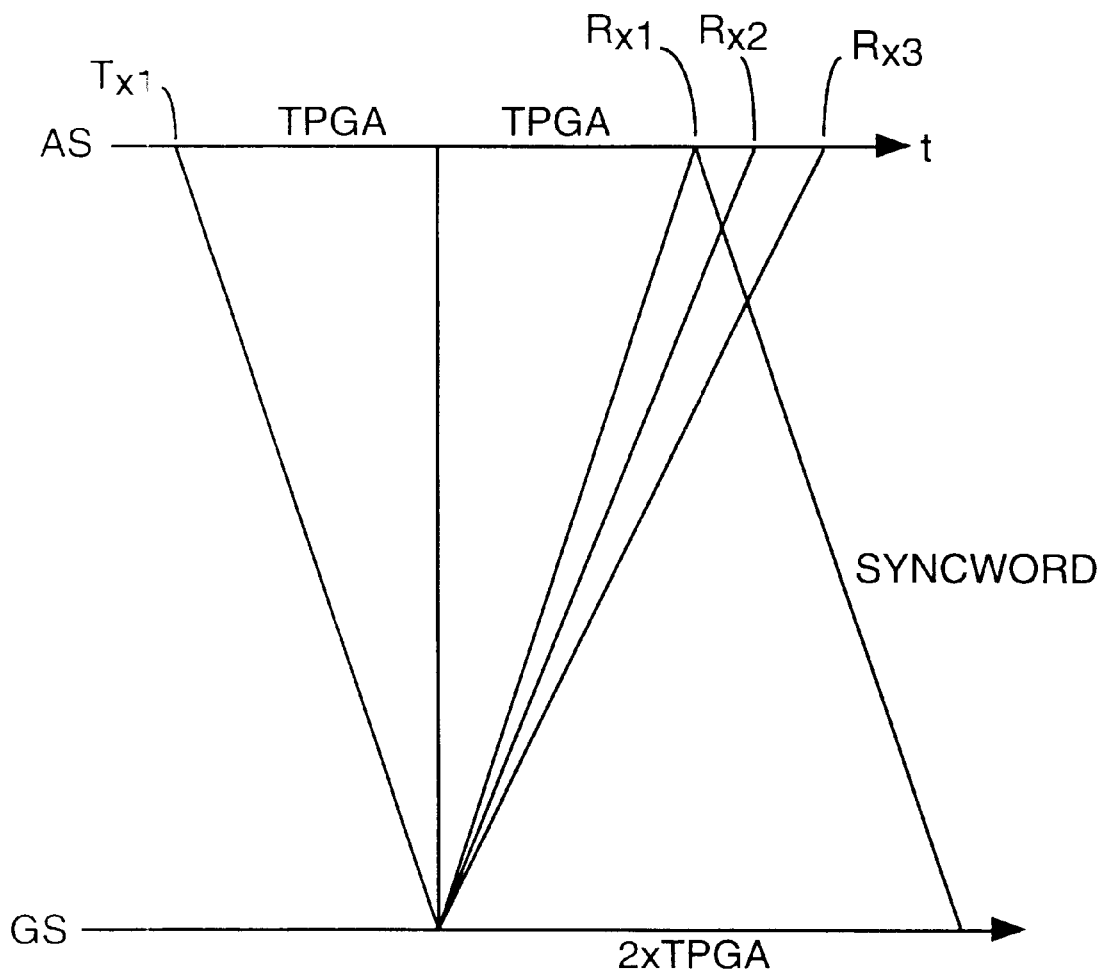
FIG. 1 schematically illustrates the timing of various signals on initial synchronisation of an air station with a ground station.

The embodiment of the invention disclosed below employs the timing procedure, already described with reference to FIG. 1, whereby a number of air stations transmit data so that it is received in respective slots of a frame defined by the ground station. For each air station the ground station monitors the precise timing of the signals received from the air stations, and every ten seconds sends an RCCH correction signal which advises the air station to advance, maintain or retard the timing of its transmissions by a unit called a sample.

Each frame has a duration of 80 ms and comprises 17 slots (16 for traffic, one for control data), each slot being approximately 4.7 ms. Each slot in turn comprises 208 bits, each bit being 22 $\mu$s, with 4 samples per bit, each sample being 5.65 $\mu$s.

Referring to FIGS. 2 and 3 an air station 1 comprises a transmit/receive unit (TRU) 2, a Modern Processor Unit (MPU) 3, and a private branch exchange 4 connected to a number of telephones aboard the aircraft on which the air station 1 is located. The MPU 3 receives and decodes the RCCH correction signal from ground station 11 via the TRU 2. The MPU 3 sends a correction signal on serial link 13 to the microcontroller 5, which via Erasable Programmable Read-Only Memory ($E^2$PROM) 6 controls the oscillator 7. The ground station 11 conveys calls from the air station to the public switched telephone network 12.

The $E^2$PROM 6 comprises a sliding scale of 255 units with a pointer which is initially set by the controller at position 128. Every time a correction signal is received from the MPU1 which advises that transmissions need to be advanced, the microcontroller increments the pointer by one unit, and for every signal received advising that transmission should be retarded, the microcontroller decrements the pointer by one unit. When the pointer reaches 0 or 255 on the scale the microcontroller detects this and increases or decreases respectively the frequency of the oscillator by 0.5 Hz and resets the pointer to position 128.

As the ground station only transmits correction signals a maximum of every ten seconds, and because a minimum of 127 corrections are required before the pointer reaches the end of the scale the maximum correction rate applied to the oscillator is once (0.5 Hz) every 28 minutes. A scale of 255 is selected so that the rate of correction of the oscillator cannot be greater than once every 15 minutes, the time for which an aircraft is normally within one cell This ensures that should an error occur with a particular ground station associated with a cell then this will not upset the operation of the air station oscillator.

Each air station 1 only transmits to the ground station when a call is placed via that air station in order to avoid overcrowding the network. Therefore correction signals are only received from the ground station when the call is in place. However for any call lasting a duration of ten seconds or more a correction signal will be received (which correction signal may simply state that no correction is actually necessary), and this correction signal is tracked on the sliding scale of the $E^2$PROM 6. Because it is a non-volatile memory the rate at which correction signals are received does not matter, and the frequency of the oscillator may only be changed 0.5 Hz in dependence on correction signals received over a number of years. Therefore the system can compensate for very low rates of drift over the operating life of the air station.

What I claim is:

1. A terrestrial flight telephone system comprising a plurality of ground stations and a plurality of air stations, each air station being carried by a respective aircraft, the ground stations and air stations being arranged to transmit data via radio signals, each of said ground stations having a clock signal and means for monitoring the arrival of the air station transmissions and transmitting a correction signal to the air station if the timing of those air station transmissions drifts relative to a desired timing determined by the ground station clock signal, each of said air stations comprising an oscillator which controls the timing of air station transmissions and means for synchronizing the air station transmissions with the ground station clock signal by advancing and/or retarding further subsequent transmissions in response to receiving said correction signal and adjusting the frequency of the air station oscillator in dependence on said correction signal.

2. The system as claimed in claim 1 wherein the monitoring means comprises means for keeping a count which is incremented for each received correction signal advising that the air station transmissions need to be advanced and decremented for each signal advising that the air station transmissions need to be retarded or vice versa.

3. The system as claimed in claim 2 wherein the means for monitoring increases the frequency of the oscillator when the count reaches a value indicating that the number of correction signals received advising transmission needs to be advanced exceeds by a predetermined value the number of correction signals received advising transmission needs to be retarded, and/or wherein the means for monitoring decreases the frequency of the oscillator when the count reaches said value indicating that the number of correction signals received advising transmission needs to be retarded exceeds by said predetermined value the number of correction signals received advising transmission needs to be advanced.

4. The system as claimed in claimed 3 wherein the frequency of correction signals, the predetermined value or values, and the duration for which the air station is normally expected to be in a cell associated with one particular ground station, are such that the number of correction signals received from one ground station alone are not sufficient to cause the means for monitoring to alter the frequency of the oscillator.

5. The system as claimed in claim 1 wherein the monitoring means comprise an Electrically Erasable Programmable Read Only Memory with a stored fixed value at a midpoint of a predetermined scale and a variable which is incremented or decremented in dependence on the received correction signals with the oscillator frequency being adjusted when the variable reaches either value at which point the variable is reset to the midpoint.

6. The system as claimed in claim 1 wherein means for monitoring comprises a non-volatile memory in which the results of the monitoring process are stored and wherein the monitoring process continues after a non-monitored period with previously recorded results.

7. The system as claimed in claim 1 wherein the oscillator is a voltage controlled oscillator, and the means for monitoring increments or decrements the control voltage applied to the oscillator.

8. The system as claimed in claim 1 wherein the clock signals of said plurality of ground stations are synchronized, defining a network time.

9. The system as claimed in claim 1 wherein the ground stations can communicate with said plurality of air stations on a common frequency by time division multiple access.

10. A method of operating a terrestrial flight telephone system comprising:

providing a clock signal at a ground station;

transmitting data between an air station aboard an aircraft and the ground station using a time division multiplexed radio signal;

synchronising transmissions from the air station with the ground station clock signal and maintaining synchronisation using an oscillator of the air station;

monitoring the transmissions received at the ground station and transmitting a correction signal to the air station if the timing of the transmissions received at the ground station from the air station drift relative to a desired timing determined by the ground station clock signal;

advancing and/or retarding transmissions from the air station in response to receiving said correction signal; and monitoring successive correction signals and adjusting the frequency of the air station oscillator in dependence thereon.

11. A terrestrial flight telephone system comprising:

at least one ground station for transmitting data including correction signals; and an air station aboard an aircraft for transmitting data to said one ground station and receiving data including the correction signals from said one ground station, said air station comprising:

an oscillator, means for synchronizing transmissions with said one ground station, and means for maintaining a frequency of said oscillator at a desired frequency using the correction signals from said ground station by adjusting the frequency of the oscillator to the desired frequency after a predetermined number of correction signals are received by the air station.

* * * * *